Jan. 18, 1966
T. A. DEPREZ
3,229,552
INDEX MECHANISM
Filed Oct. 10, 1963
2 Sheets-Sheet 1
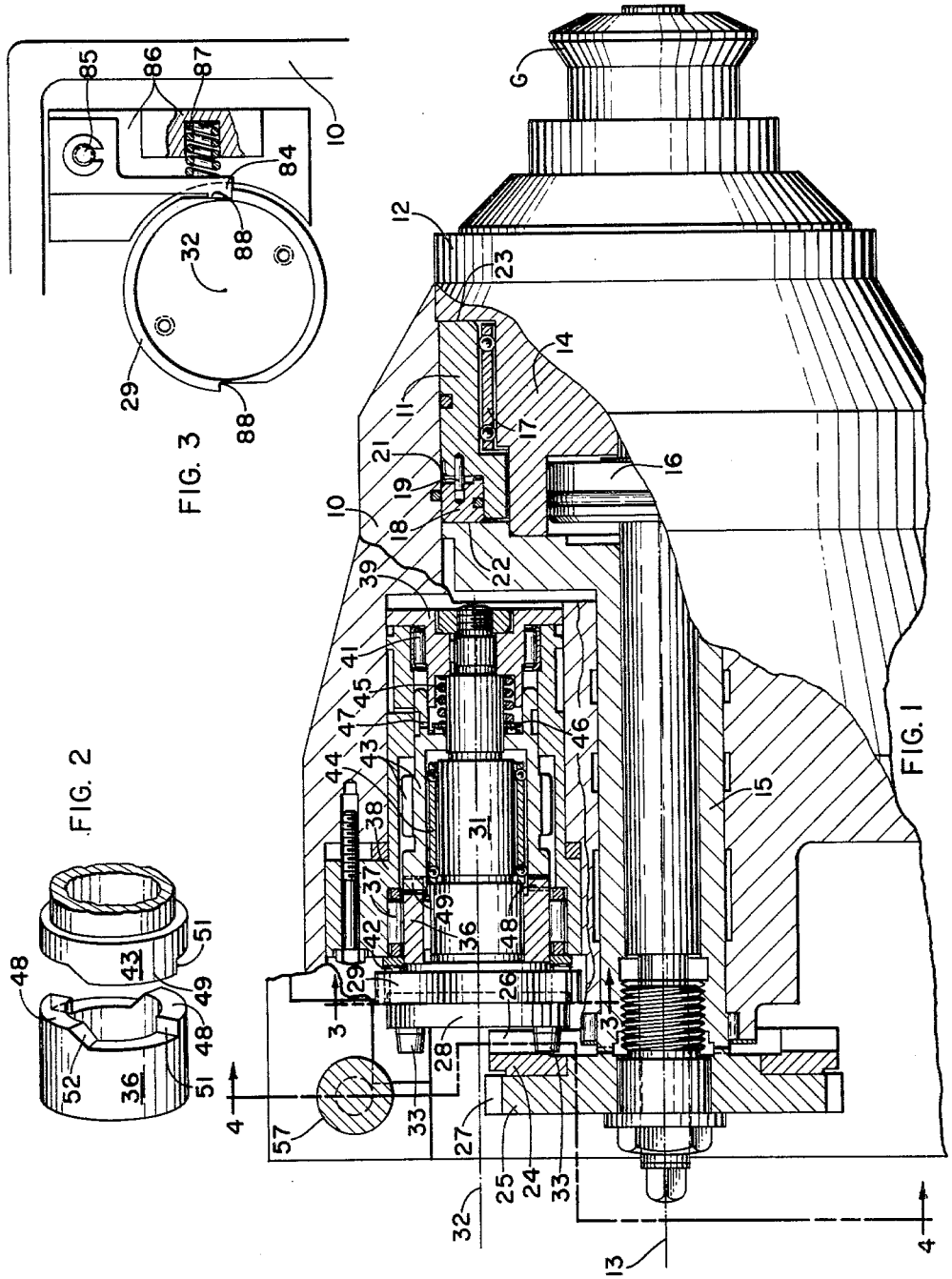
INVENTOR.
THOMAS A. DEPREZ
BY
*Richard W. Treventon*
ATTORNEY Jan. 18, 1966 T. A. DEPREZ 3,229,552
INDEX MECHANISM
Filed Oct. 10, 1963 2 Sheets-Sheet 2

United States Patent Office 3,229,552
Patented Jan. 18, 1966

3,229,552
INDEX MECHANISM
Thomas A. Deprez, Rochester, N.Y., assignor to The Gleason Works, Rochester, N.Y., a corporation of New York
Filed Oct. 10, 1963, Ser. No. 315,205
6 Claims. (Cl. 74—820)

The present invention relates to an intermittent index mechanism for machine tools, for example for the work spindles of gear cutting machines.

The primary object of the invention is a simple and rugged mechanism capable of accurate indexing at high speed without excessive acceleration or impact loads. The mechanism comprises a housing rotatably supporting a radially slotted driven wheel and a rotary driver which has two diametrically opposed drive pins for alternate engagement in the wheel slots, a rotatable member coaxial with the driver and movable axially thereon, said member having face clutch teeth of ratchet form engageable with complementary face clutch teeth on the driver, means for effecting reversing rotation of said member through an angle of substantially 180°, means for exerting pressure on said member in an axial direction to engage said teeth and thereby cause the driver to move in unison with the member during rotation of the latter in one direction and to permit the teeth to disengage by mutual cam action to allow return rotation of said member free of the driver, and means for holding the driver against rotation during such return rotation of said member. The means for effecting reversing rotation may comprise a reversing fluid pressure motor, while the means for engaging and disengaging said pawl may comprise a piston-valve connected to the pawl, the piston-valve being arranged to coordinate the operation of said motor with the engagement and disengagement of said pawl. Preferably the means for holding the driver against rotation includes a spring-backed pawl supported by the housing and engageable with a ratchet formation on the driver to prevent return rotation of the latter.

A preferred embodiment of the invention, applied to the work spindle of a gear cutting machine, is shown in the accompanying drawings, wherein:

FIG. 1 is a view primarily in section in planes which contain the axes of the driver and the driven wheel, these planes being approximately as indicated by section line 1—1 in FIG. 4;

FIG. 2 is a fragmentary perspective view of a pinion and a clutch member shown in section in FIG. 1;

FIG. 3 is a detail cross sectional view, in plane 3—3 of FIG. 1;

Figure 4:
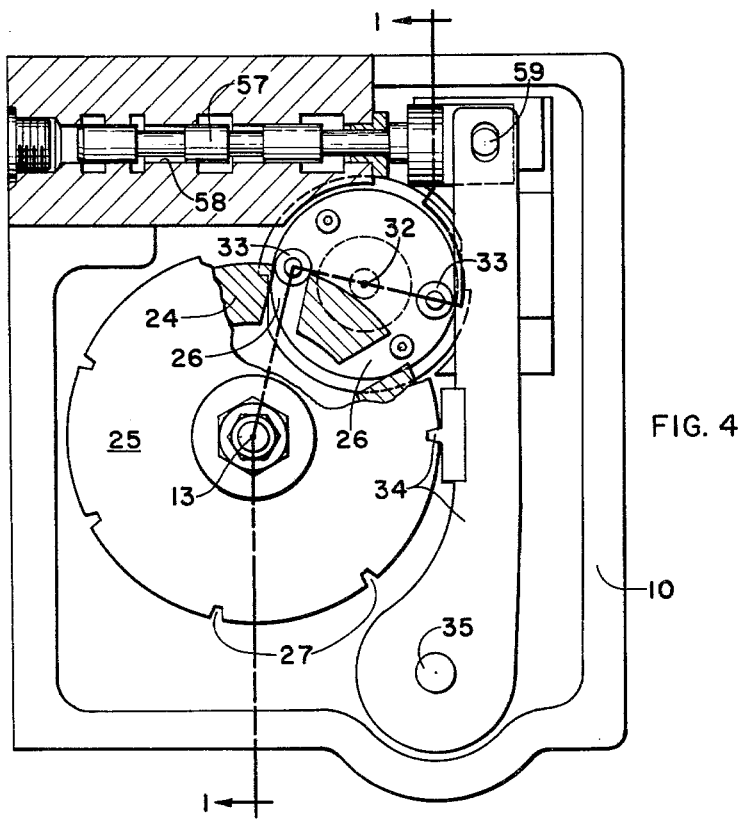
FIG. 4 is a view at right angles to FIG. 1, in the transverse planes there designated 4—4, but with the mechanism in a different phase of its operating cycle.

The illustrated mechanism comprises a multi-part housing 10 including, as rigidly connected parts thereof, a bearing ring 11 and a frontal ring 12. A work spindle journaled in the housing for rotation and limited axial motion on axis 13 comprises rigidly connected front and rear sections, 14 and 15, which enclose a cylinder chamber containing the actuating piston 16 of a device for chucking a workpiece G on the front of the spindle. A ball sleeve bearing 17 supports the front portion of the spindle in bearing ring 11. An annular spindle clamp piston 18, disposed between main housing section 10 and ring 11, is adapted for slight axial motion but is held against rotation by a pin 19. When hydraulic pressure is applied to annular chamber 21 in front of piston 18, the surfaces at 22 and 23 are clamped together, so that any loads exerted on the workpiece by the cutting tool are transmitted directly to housing 10, 11. By release of this pressure the spindle is released for the slight axial motion necessary for free work-indexing rotation.

A two-part index driven wheel 24, 25 is rigidly but detachably secured to the end of the spindle remote from the workpiece. One part, plate 24, has equally spaced radial slots 26 corresponding in number to the teeth to be cut in the workpiece. The other part, plate 25, has around its periphery the same number of equally spaced notches 27. The index driver comprises a disc 28 secured rigidly but detachably to flange 29 of a shaft 31 whose rotation axis 32 is parallel to axis 13. The driver disc carries two diametrically opposed drive pins 33, preferably rollers, adapted for alternate engagement in radial slots 26. A pawl 34, for engagement with notches 27 for final positioning of the spindle during each indexing cycle, is pivoted to the housing by a pin 35.

An annular face clutch member 36 is keyed to the end portion of shaft 31 adjacent flange 29, and is supported on bearing rollers 37 in a sleeve 38 that is secured rigidly in housing 10. The opposite end portion of the shaft is keyed to an annular member 39 which is supported in the sleeve on bearing rollers 41. The shaft has a shoulder bearing axially against member 39 and is held against axial displacement toward plate 24 by the bearing of this member against the forward end of sleeve 38. Needle bearings 42 interposed between flange 29 and the opposite end of the sleeve support the shaft against axial motion away from plate 24. A pinion 43 is supported on ball sleeve bearing 44 for axial and angular motion on the shaft, and has face clutch teeth for engagement with the teeth of member 36. A coil spring 45 acting between member 39 and the pinion 43 presses the latter axially, to the left in FIG. 1, to engage the clutch teeth. Between the spring and the pinion are interposed a washer and needle bearings 46. Hydraulic fluid under pressure may be applied through an opening 47 in the pinion to the chamber containing the spring, also for pressing the pinion to the left, to maintain the clutch teeth in engagement.

There are preferably two diametrically opposed clutch teeth 48 on member 36, and two complementary mating clutch teeth 49 on the pinion 43. The teeth are of ratchet form, the sides 51 thereof which engage during counterclockwise rotation of the pinion in FIG. 2 (clockwise in FIG. 4) being of low or zero pressure angle, i.e. lying approximately in a plane containing axis 32, while the opposite tooth sides 52 are of much higher pressure angle so that the teeth may readily separate by mutual cam action upon clockwise rotation of the pinion, in FIG. 2. In the illustrated embodiment the sides 52 are helicoidal surfaces having an average pressure angle on the order of 55°.

Figure 5:
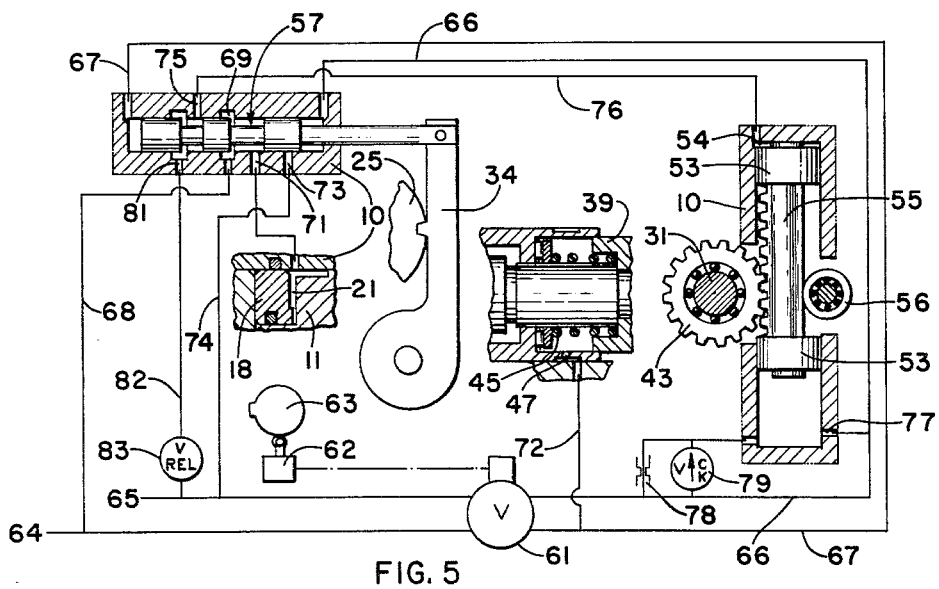
FIG. 5 is a schematic view illustrating the fluid pressure control system.

For actuating the index mechanism, a piston 53, FIG. 5, reciprocable in a cylinder 54 in housing 10, has as a part thereof a rack gear 55 meshing with pinion 43. To support the rack in such engagement, an anti-friction roller 56 bearing against it is mounted for rotation in the housing. The application of hydraulic pressure to the fluid pressure piston motor 53, 54, and also to spindle clamp chamber 21, is controlled in part by a piston-valve 57, FIGS. 4 and 5, which is slidable in bore 58 and is pivotally connected at 59 to pawl 34. The hydraulic control system in the illustrated embodiment further includes a solenoid-operated reversing valve 61 controlled by an electric switch 62 actuated by a cam 63 of the gear cutting machine.

While the machine is cutting, the valve 61 connects hydraulic pressure and exhaust lines, 64 and 65 respectively, to lines 66 and 67 so that piston 53 is held in its upper limit position, and pinion 43 in its counterclockwise limit position; piston-valve 57 is held in its left limit position wherein pawl 34 is engaged with a notch 27 of index plate 25; pressure is applied through line 68 and ports 69 and 71 to spindle clamp chamber 21; and the chamber containing spring 45 is on exhaust through line 72, the spring 45 alone holding the clutch teeth 48, 49 engaged. In the phase of each cycle of the machine when indexing of the work spindle is to take place, the lobe of cam 63 opens switch 62 for the short time interval that is required for indexing. Immediately upon such opening the valve 61 is reversed, placing lines 66 and 67 on exhaust and pressure, respectively. Pressure is applied to the chamber of spring 45, greatly augmenting the pressure of the spring in its action of pressing the clutch teeth 48, 49 together. Piston-valve 57 is moved to the right, disengaging pawl 34 from plate 25 and, simultaneously, cutting off pressure port 69 from port 71 and connecting the latter to port 73 so that the spindle clamp is released, chamber 21 being placed on exhaust through line 74. Simultaneously pressure port 69 is connected to port 75 so that pressure is applied through line 76 to the upper chamber of cylinder 54, resulting in the downward, indexing stroke of piston 53. Pinion 43 and driver 28, 33 are thereby rotated clockwise through 180°, advancing the work spindle assembly 25, 24, 15 through one pitch of work gear G. The final portion of the indexing stroke is dash-potted by piston 53 covering the port 77 which leads to exhaust line 66. The final exhaust to line 66 is through a restrictor 78 since the exhaust flow results in the closing of a check valve 79 that is connected in parallel with the restrictor. During the latter part of this indexing stroke the momentum of the work spindle assembly and the driver assembly 33, 28, 31, 36 causes the latter to tend to run ahead of the pinion 43, which would cause the clutch teeth 48, 49 to cam themselves out of engagement. This tendency is overcome by the combined force of spring 45 and of the hydraulic pressure in the spring chamber.

As soon as the lobe of cam 63 is past the switch 62, the latter closes and thereby again reverses valve 61 so that pressure is applied through line 66 to the right end of the piston-valve 57, causing it to engage the pawl 34 with plate 25 and thereby accomplish final fine indexing of the work spindle. Only at the end of this motion of the piston valve 18, 21 is the pressure port 69 opened to port 71, so that the spindle clamp is applied only after the indexing has been completed. The reversal of valve 61 immediately releases the hydraulic pressure in the chamber containing spring 45, and applies pressure through check valve 79 to the bottom of piston 53. However, the upstroke of the piston does not occur until the terminal part of the stroke of the piston-valve to the left, when port 75 is opened to port 81 which is connected by line 82 to exhaust line 65. A relief valve 83 in line 82 imposes a back pressure on the piston 53, so that the upward return stroke of the latter is relatively slow. However, the machine cycle may be so phased relative to cam 63 that cutting action may commence, prior to completion of the return stroke of the piston, as soon as the spindle clamp 18, 21 is applied.

During the return stroke, in which the pinion 43 is turned counterclockwise in FIGS. 4 and 5, the fact that the plate 25 is held against rotation by pawl 34 and clamp 18, 21, prevents driver 33, 28 and clutch member 36 from rotating counterclockwise, so that the clutch teeth 49 on the counterclockwise rotating pinion cam themselves axially out of engagement with clutch teeth 48, against the relatively light resistance of spring 45, the hydraulic pressure in the spring chamber having been released. At the end of the 180° return rotation of the pinion the clutch teeth re-engage under pressure of the spring, thereby completing the indexing cycle.

Although the driver 33, 28 can have no substantial counterclockwise motion because of the engagement of roller 33 in a slot 26, it has been observed that the driver may oscillate through a small angle during the return counterclockwise motion of pinion 43, due to slight clearance provided between the roller and the walls of the slot. To obviate this oscillation it is preferred to provide a ratchet means to positively prevent counterclockwise rotation of the driver. This ratchet means comprises a pawl 84, FIG. 3, pivoted by pin 85 to a bracket 86 rigidly secured to the housing, and a spring 87 acting between the bracket and pawl to press the latter into one of two diametrically opposed notches 88 in flange 29 at the end of each indexing stroke.

Having now described the improved index mechanism, and its operation, what I claim as my invention is:

1. An index mechanism comprising a housing rotatably supporting a radially slotted driven wheel and a rotary driver which has two diametrically opposed drive pins for alternate engagement in the wheel slots, a rotatable member coaxial with the driver and movable axially thereon, said member having face clutch teeth of ratchet form engageable with complementary face clutch teeth on the driver, means for effecting reversing rotation of said member through an angle of substantially 180°, means for exerting pressure on said member in an axial direction to engage said teeth and thereby cause the driver to move in unison with the member during rotation of the latter in one direction and to permit the teeth to disengage by mutual cam action to allow return rotation of said member free of the driver, and means for holding the driver against rotation during such return rotation of said member.

2. A mechanism according to claim 1 in which said means for exerting pressure is arranged to apply a greater pressure during the rotation of said member in said one direction than during the return rotation thereof, to permit disengagement of the clutch teeth only during the return rotation.

3. A mechanism according to claim 2 in which said means for exerting pressure comprises a spring acting constantly against the member in said axial direction, and means for applying fluid pressure against said member in said axial direction during the rotation in said one direction and for releasing said pressure for the return rotation.

4. A mechanism according to claim 1 in which the means for holding the driver against rotation comprises a pawl supported by the housing and engageable with notches in the driven wheel, and means, coordinated with said means for effecting reversing rotation, for disengaging said pawl prior to rotation in said one direction and engaging said pawl prior to return rotation.

5. A mechanism according to claim 1 in which the means for effecting reversing rotation comprises a reversing fluid pressure motor, and said means for engaging and disengaging said pawl comprises a piston-valve arranged to coordinate the operation of said motor with the engagement and disengagement of said pawl.

6. A mechanism according to claim 1 in which said means for holding the driver against rotation comprises a spring-backed pawl supported by the housing and engageable with a ratchet formation on the driver to prevent return rotation of the latter.

References Cited by the Examiner
UNITED STATES PATENTS

| | | | |
|---|---|---|---|
| 1,942,927 | 1/1934 | Johnson et al. | 74—821 |
| 2,831,374 | 4/1958 | Fowler et al. | 74—820 |

References Cited by the Applicant
UNITED STATES PATENTS

| | | | |
|---|---|---|---|
| 2,188,996 | 2/1940 | Carlsen | 74—820 |
| 2,898,780 | 8/1959 | Carlsen et al. | 75—816 |
| 3,139,194 | 6/1964 | Howing | 214—1 |
| 3,166,954 | 7/1964 | Fowler et al. | 74—822 |

BROUGHTON G. DURHAM, *Primary Examiner.*